Dec. 21, 1954  ACHILLE CARLO SAMPIETRO  2,697,360
KNOWN AS
ACHILLES CHARLES SAMPIETRO
VARIABLE SPEED GEARING OF THE EXPANSIBLE PULLEY TYPE
Filed Nov. 9, 1951   3 Sheets-Sheet 2

INVENTOR
ACHILLE CARLO SAMPIETRO, KNOWN AS
ACHILLES CHARLES SAMPIETRO
by Ralph B. Stewart
Attorney Dec. 21, 1954

ACHILLE CARLO SAMPIETRO
KNOWN AS
ACHILLES CHARLES SAMPIETRO 2,697,360

VARIABLE SPEED GEARING OF THE EXPANSIBLE PULLEY TYPE

Filed Nov. 9, 1951

3 Sheets-Sheet 3

INVENTOR
ACHILLE CARLO SAMPIETRO, KNOWN AS
ACHILLES CHARLES SAMPIETRO
by Ralph B. Stewart
Attorney United States Patent Office 2,697,360
Patented Dec. 21, 1954

2,697,360

VARIABLE SPEED GEARING OF THE EXPANSIBLE PULLEY TYPE

Achille Carlo Sampietro, known as Achilles Charles Sampietro, Detroit, Mich.

Application November 9, 1951, Serial No. 255,565

Claims priority, application Great Britain November 14, 1950

7 Claims. (Cl. 74—230.2)

This invention relates to variable speed gearing of the expansible pulley type and its principal object is to provide a new expansible pulley construction for use in such gearing.

According to this invention, variable speed gearing of the expansible pulley type includes an expansible pulley comprising an expansible envelope constituting at least a portion of the boundary of a fluid-tight chamber, and providing a peripheral driving surface which is of general cylindrical form and is approximately coaxial with the axis of rotation of the pulley, means for introducing fluid under pressure into the fluid-tight chamber for expanding the envelope and means within the chamber and expansible radially with the envelope for maintaining the peripheral driving surface approximately cylindrical when the pulley is under load.

A variable speed gear may comprise two such pulleys rotatably mounted within a supporting frame with their axes parallel, an endless flexible driving band connecting the two pulleys, means for connecting the chamber of one pulley to a source of fluid under pressure, means for varying the fluid pressure in the said one pulley and means for relieving the fluid pressure in the chamber of the other pulley.

Figure 1:
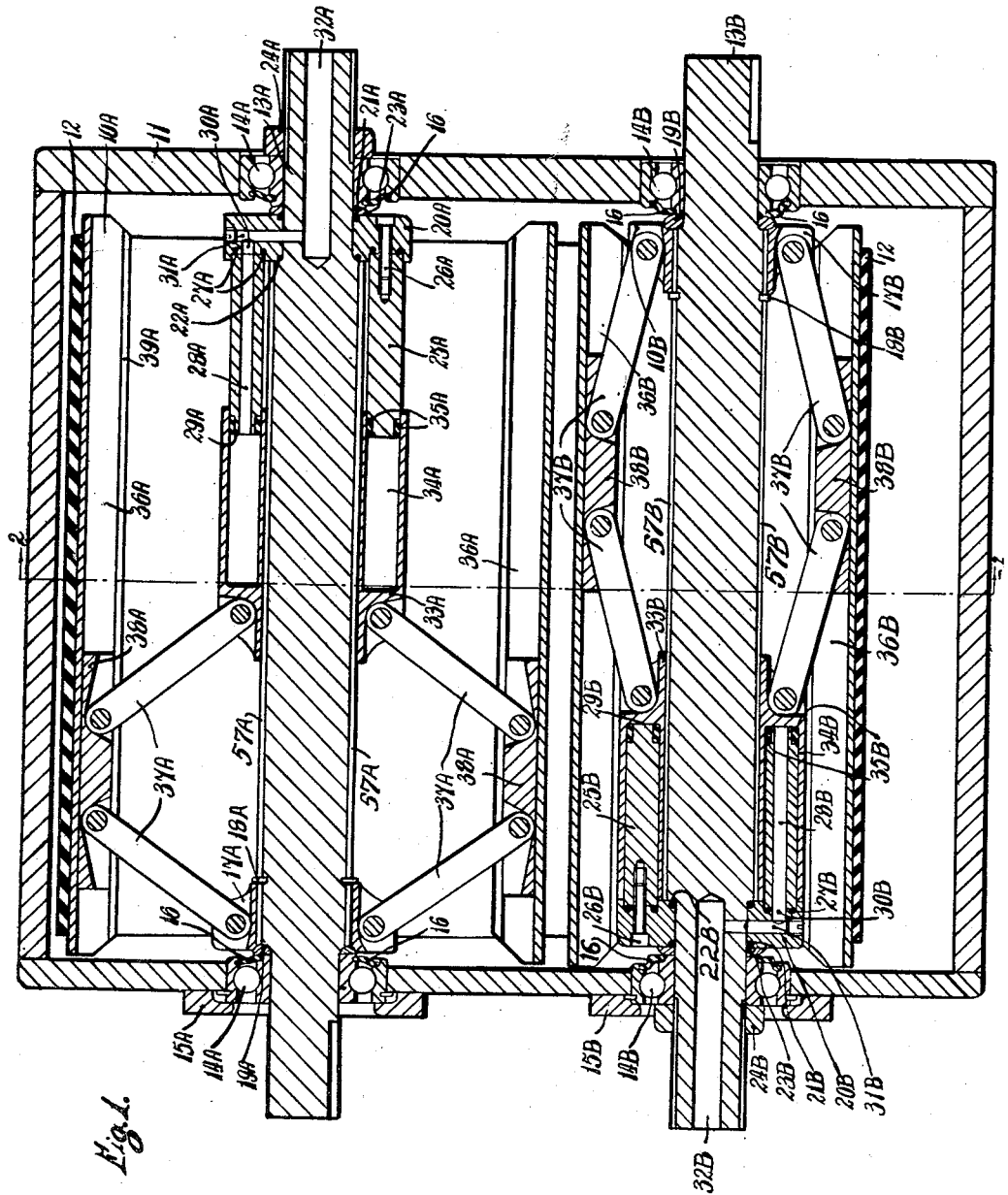
Figure 2:
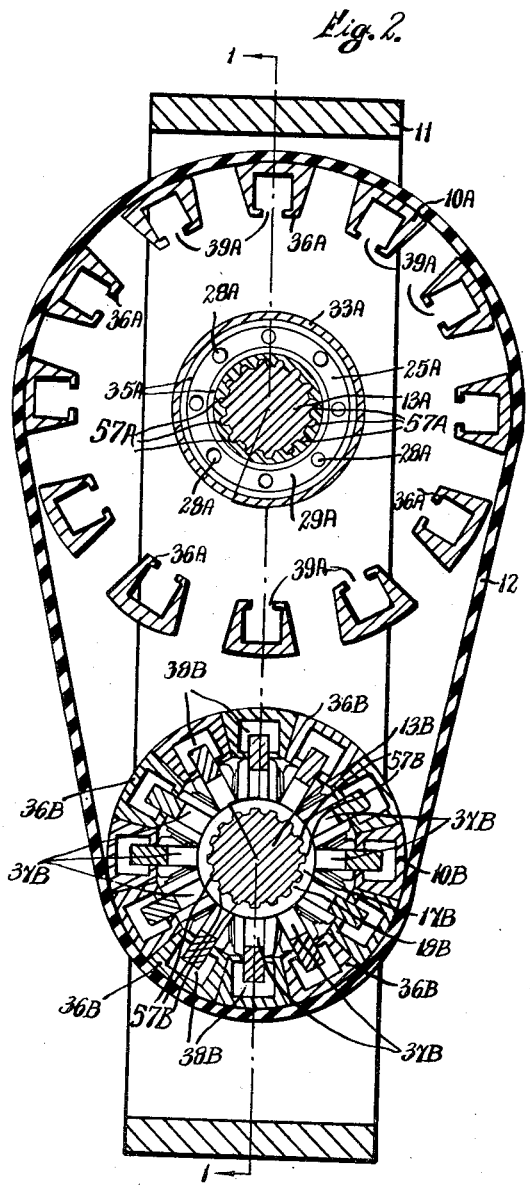
Figure 3:
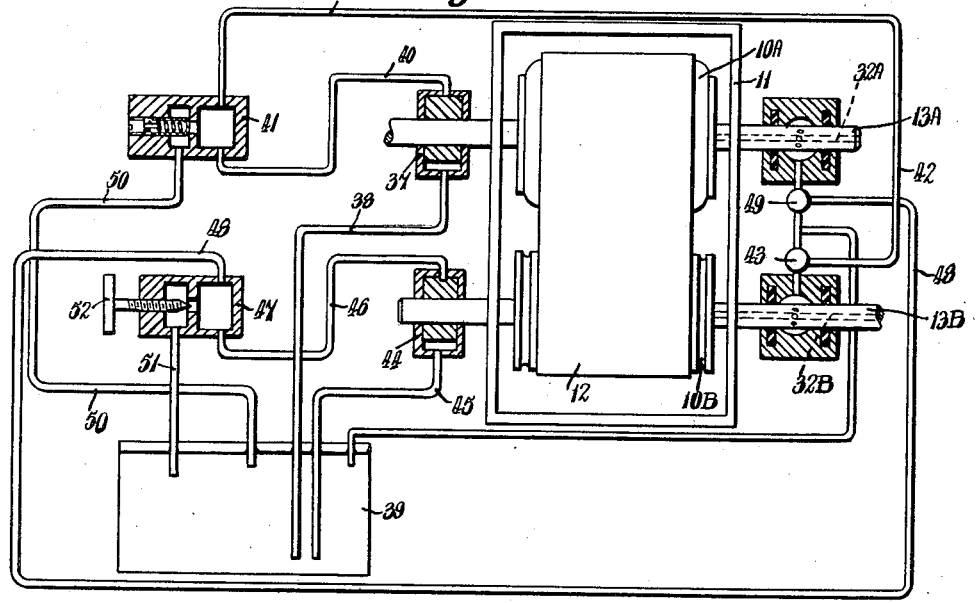
Figure 4:
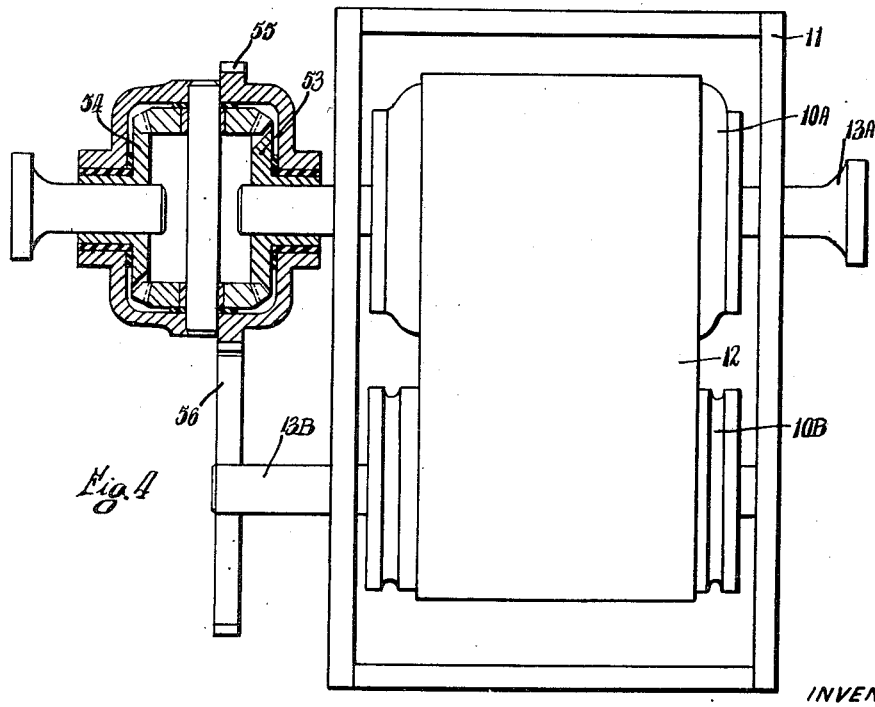

A variable speed gear embodying the invention will now be described, by way of example with reference to the accompanying diagrammatic drawings wherein:

Fig. 1 is a section through a variable speed gearing and taken on the line I—I in Fig. 2, Fig. 2 is a section taken on the line 2—2 in Fig. 1, Fig. 3 is a schematic diagram showing a control system for an expansible pulley variable speed gearing, and Fig. 4 is a view, partly in section and partly in elevation, of an expansible pulley variable speed gearing in parallel with a differential gear.

Referring now to Figs. 1 and 2, the variable speed gear consists of two radially-expansible pulleys 10A and 10B mounted in a supporting frame structure 11, the drive between them being by means of an endless flexible steel band 12. The pulley 10A includes a shaft 13A rotatably mounted in two ball bearings 14A which are disposed one at each end of the shaft. The extreme ends of the shaft are provided with suitable splines 15A for connecting the shaft to driving means or to means to be driven.

One of the two bearings 14A supporting the shaft 13A is held by a clamping ring 16A in a recess in one of the side walls of the frame structure 11. The other bearing is free to move axially in its recess in the other side wall to allow differential axial expansion of the shaft and the frame structure.

The portions of the shaft projecting through the bearings 14A are reduced in diameter relatively to the portion between the bearings, the portion of the shaft between the bearings being provided with axially-extending splines 53A. A link-supporting hub 17A and a disc 18A are fitted on each end of the shaft 13A with each hub abutting a retaining ring 54A on the shaft; the splines 53A on the shaft engage in corresponding recesses in the hub and the disc and prevent relative rotation between them. A washer 19A is provided to seal the joint between each disc 18A and its respective shaft and is clamped against the joint by an oil-retaining ring 20A which is disposed on the reduced portion of the shaft and abuts the washer 19A on one side and the inner member of the ball bearing 14A on the other side.

The peripheral driving surface of the pulley, i. e. the surface that contacts the driving band 12, is constituted by the outer surface of a cylindrical tube 21A surrounding the middle portion of the shaft and formed from reinforced rubber material. Suitable reinforcements for the tube are, for example, woven steel mesh, fibre glass and woven nylon fabrics, one or more layers being used. It is found that such reinforced rubber materials can be prepared which, whilst having good elastic properties can withstand tensions of up to about 50,000 p. s. i. The border portion at each end of the tube 21A is clamped against the periphery of the adjacent disc 18A (this periphery being frusto-conical in shape) by a clamping annulus 22A screwed to the disc; the tube 21A, shaft 13A and annulus 22A thus form a fluid-tight, cylindrical chamber enclosing the middle portion of the shaft.

A number of hollow-square-section, longitudinal rib members 23A each have one face fastened to the inner surface of the tube 21A, the members being spaced at regular intervals around the inner surface and having their longitudinal axes parallel to the shaft axis. For the sake of clarity some of the rib members are omitted from Fig. 1. Two runners 24A are capable of free sliding movement in the passage in each hollow rib member. Each runner is connected to the adjacent fixed link-supporting hub 17A by a first link 25A which is pivoted at its ends to the runner and to the fixed hub. The link passes through a longitudinal slot 26A in the radially inner wall of the hollow rib member.

A second link 27A is pivoted to each runner 24A, extends through the longitudinal slot 26A and is pivoted to an adjacent one of two hubs 28A mounted for free, axial sliding movement along the shaft. The splines 53A on the shaft prevent relative rotation between it and the slidable hubs 28A. The arrangement of this linkage is such that, when the diameter of the pulley is at its minimum value the adjacent faces of the slidable hubs 28A abut each other (as in pulley 10B), and as the diameter of the pulley increases, each slidable hub moves along the shaft towards the ends thereof.

The interior of the pulley is in communication with a source (not shown in Figs. 1 and 2) of a suitable fluid under pressure by radial bores 29A in the shaft leading from a common axial bore 30A. A fluid-tight junction is obtained by any well-known means between the axial bore 30A in the rotatable shaft and a stationary supply pipe leading to the said source. The pulley is expanded by forcing the fluid, which is preferably a liquid, e. g. oil, into the interior of the pulley, the pulley diameter being determined by the pressure therein of the liquid. This pressure may be varied conveniently by varying the delivery pressure of the said source, e. g. by providing a metering orifice of variable cross-sectional area in the supply pipe from the source to the pulley.

The tube 21A is pleated to the shape it assumes when the pulley is of minimum diameter so that it tends to return to that same shape as the pulley diameter is reduced. All the pleats are directed radially inwards so that they are not caught and nipped between the pulley periphery and the driving band 12. Longitudinally disposed pleats 31A occur between each two adjacent longitudinal rib members 23A and a peripheral pleat 32A occurs at each end of the pulley between the border portion gripped by the clamping annulus 22A and the adjacent ends of the rib members 23A.

The pulley 10B is similar to the pulley 10A. Thus a shaft 13B mounted in two ball bearings 14B is provided at its ends with splines 15B. One bearing 14B is held by a clamping ring 16B, while the other is free to move axially in its recess. The shaft 13B is provided with splines 53B and has a link-supporting hub 17B and a disc 18B fitted on each end with each hub abutting a retaining ring 54B. A washer 19B and oil-retaining ring 20B is provided for each disc 18B. The peripheral driving surface of the pulley 10B and its associated articulated linkage are formed, as in the pulley 10A, by a cylindrical tube 21B, clamping annulus 22B, rib members 23B having slots 26B formed therein, runners 24B, first links 25B, second links 27B and hubs 28B. The interior of the pulley is supplied with fluid under pressure by radial bores 29B and a common axial bore 30B in the shaft 13B. The tube 21B of the pulley is provided with longitudinally disposed pleats 31B and peripheral pleats 32B to prevent nipping of the tube by the driving band 12.

A part of the torque applied to the shaft or to the pulley periphery is transmitted through the discs 18A and 18B and the two pleated end portions of the tube and the remainder is transmitted by the internal linkage. The torque transmitted by the internal linkage may be made of negligible or appreciable value by suitable variations in the design but, the primary purpose of the linkage is to prevent the segment of the pulley periphery, which is not in contact with the driving band 12 at any given moment, from moving radially outwards from the shaft when the band is under tension. In this embodiment, since the endless driving band is of a relatively inextensible material, i. e. steel, it will be apparent that as one pulley increases in diameter the diameter of the other pulley must decrease simultaneously and vice versa. When it is desired to vary the speed ratio it is only necessary to force liquid into the requisite pulley and, for example, to connect the interior of the other pulley to a suitable relief valve. As one pulley increases in diameter the tension in the driving band, and thus its pressure on the other pulley, increases and liquid is forced from the interior of the other pulley and escapes past the relief valve into a reservoir.

An example of a suitable control for the gear is shown schematically in Fig. 3. The shaft 13A of the driving pulley 10A constitutes the input shaft of the gearing and is rotated by a motor (not shown), the shaft driving a force pump 33 mounted thereon. A pipe 34 leads from an oil reservoir 35 to the force pump 33, oil under pressure from the pump passing through a pipe 36, a pressure-relief valve 37, a pipe 38, a two-way valve 39 and the bore 30B in the shaft 13B to the interior of the driven pulley 10B. A force pump 40 is mounted on the shaft 13B and is driven thereby, the pump being connected through a pipe 41 to the reservoir 35 and through a pipe 42, an adjustable orifice 43, a pipe 44, a two-way valve 45 and the bore 30A in the shaft 13A to the interior of the driving pulley 10A. Return pipes 46 and 47 to the reservoir 35 are provided for relief valve 37 and adjustable orifice 43 respectively. The shaft 13B constitutes the output shaft of the gearing.

The gear ratio is adjusted by operation of a handwheel 48 of the adjustable orifice 43. Clockwise rotation of the wheel 48 reduces the orifice, thus increasing the pressure of the oil supplied to the pulley 10A and causing it to increase in diameter. Oil escaping through the orifice passes through the pipe 47 to the reservoir 35. The increase in diameter of the pulley 10A causes an increase in the tension in the driving band 12 and a consequent increase in the pressure of the oil in the pulley 10B. This increased oil pressure opens the relief valve 37, allowing oil to flow through pipe 46 to the reservoir. The pressure of the oil in the pulley 10B is maintained by the pump 33 at a value determined by the relief valve 37, this value being sufficient to prevent the pulley from decreasing in diameter under normal working conditions.

A pulley such as that described above and of peripheral length 15 ins., minimum external diameter 5 ins., maximum external diameter 8½ ins. and utilising fluid pressures in the driving pulley of between about 20 and 100 p. s. i. can be arranged to work efficiently with torque inputs of up to about 250 to 300 pounds/foot. Variable speed gearing incorporating two such pulleys can multiply and divide torque by a factor of up to about 2.

The variable speed gear may be used in conjunction with a differential gear, as shown in Fig. 4. The pulley 10A has one end of its shaft 13A coupled to a first one 49 of the two sun pinions of the differential gear and its other end coupled to the means to be driven (not shown). The driving means (not shown) are coupled to the second sun pinion 50. The planet carrier gear wheel 51 of the differential gear meshes with a gear wheel 52 mounted on the shaft 13B of the pulley 10B, this latter shaft serving as a layshaft. Such a combined gear has the advantages that the torque load is shared between the two gears, thus enabling the torque load on the variable speed gear to be reduced, and that variations in the speed ratio of the variable speed gear produce corresponding greater variations in the speed ratio of the combined gear. Thus, assuming the speed of the shaft connected to the sun pinion 50 is $n_1$, the speed of the layshaft is $n_3$, the sun pinions 49 and 50 are of equal diameter and the speed ratio of the variable speed gearing is $n_3 = n_2 K$; then the speed $n_2$ of the shaft 13A will be given by the relation:

$$n_2 = \frac{n_1}{2K+1}$$

It will be apparent that if the two sun pinions 53, 54 are not of equal diameter the integer 2 in the relation will be replaced by some other integer, which is not necessarily a whole number.

What I claim is:

1. Variable speed gearing of the expansible pulley type including an expansible pulley comprising an expansible envelope constituting at least a portion of the boundary of a fluid-tight chamber, and providing a peripheral driving surface which is of general cylindrical form and is approximately coaxial with the axis of rotation of the pulley, means for introducing fluid under pressure into the fluid-tight chamber for expanding the envelope and a support structure within the chamber and expansible radially with the envelope for maintaining the peripheral driving surface approximately cylindrical when the pulley is under load.

2. Variable speed gearing of the expansible pulley type including an expansible pulley comprising a shaft, an expansible envelope surrounding at least a portion of said shaft, constituting at least a portion of the boundary of a fluid-tight chamber, and providing a peripheral driving surface which is of general cylindrical form and is approximately coaxial with the shaft, an axial bore in said shaft and radial bores in said shaft leading from said axial bore to the interior of the fluid-tight chamber, for introducing fluid from the exterior under pressure into the fluid-tight chamber for expanding the envelope and a support structure within the chamber and expansible radially with the envelope for maintaining the peripheral driving surface approximately cylindrical when the pulley is under load.

3. Variable speed gearing of the expansible pulley type including an expansible pulley comprising a shaft, an expansible envelope surrounding at least a portion of said shaft, constituting at least a portion of the boundary of a fluid-tight chamber, and providing a peripheral driving surface which is of general cylindrical form and is approximately coaxial with the shaft, means for introducing fluid under pressure into the fluid-tight chamber for expanding the pulley, two hubs mounted on the shaft within the envelope, one of the hubs being fixed to said shaft and the other being slidable axially on the said shaft, means for preventing relative rotation between the said slidable hub and the shaft, rib members secured to the inner surface of the envelope and extending in a direction parallel to the axis of the shaft and a pair of links for each rib member, each link of the pair being pivotally connected at one end to the associated rib member and the other end of one of said links being pivotally connected to the hub fixed on the shaft and the other end of the other link of said pair being pivotally connected to the said hub which is slidable on the shaft, said hubs together with said rib members and said links constituting an articulated linkage which is expansible radially with the envelope and maintains the peripheral driving surface approximately cylindrical when the pulley is under load.

4. Variable speed gearing as claimed in claim 3, wherein the said means for introducing fluid under pressure into the fluid-tight chamber comprise an axial bore in said shaft and radial bores leading from said axial bore to the interior of the pulley.

5. A variable diameter pulley for use in change speed gearing of the expansible pulley type, the pulley comprising a shaft, an expansible envelope surrounding at least a portion of said shaft, constituting at least a portion of the boundary of a fluid-tight chamber, and providing a peripheral driving surface which is of general cylindrical form and is approximately coaxial with the shaft, means for introducing fluid under pressure into the fluid-tight chamber for expanding the envelope and a support structure within the chamber and expansible radially with the envelope for maintaining the peripheral driving surface approximately cylindrical when the pulley is under load.

6. Variable speed gearing of the expansible pulley type including an expansible pulley comprising an expansible envelope constituting at least a portion of the boundary of a fluid-tight chamber, the envelope being prepleated to the form it assumes with the pulley in the unexpanded condition, and providing a peripheral driving surface which is of general cylindrical form and is approximately coaxial with the axis of rotation of the pulley, means for introducing fluid under pressure into the fluid-tight chamber for expanding the envelope, and a support structure within the chamber and expansible radially with the envelope for maintaining the peripheral driving surface approximately cylindrical when the pulley is under load.

7. A variable diameter pulley for use in change speed gearing of the expansible pulley type, the pulley comprising a shaft, an expansible envelope surrounding at least a portion of said shaft and constituting at least a portion of the boundary of a fluid-tight chamber, the envelope being prepleated to the form it assumes with the pulley in the unexpanded condition, and providing a peripheral driving surface which is of general cylindrical form and is approximately coaxial with the shaft, means for introducing fluid under pressure into the fluid-tight chamber for expanding the envelope, and a support structure within the chamber and expansible radially with the envelope for maintaining the peripheral driving surface approximately cylindrical when the pulley is under load.

References Cited in the file of this patent

UNITED STATES PATENTS

| Number | Name | Date |
|---|---|---|
| 1,031,763 | Woodland | July 9, 1912 |
| 1,053,918 | Meyer | Feb. 18, 1913 |
| 1,458,662 | Miller | June 12, 1923 |
| 2,119,395 | Locke | May 31, 1938 |
| 2,161,894 | Bishop | June 13, 1939 |
| 2,164,818 | Heyer | July 4, 1939 |
| 2,198,940 | Heyer | Apr. 30, 1940 |

FOREIGN PATENTS

| Number | Country | Date |
|---|---|---|
| 225,629 | Switzerland | May 17, 1943 |